US011011759B2

(12) United States Patent
Kim et al.

(10) Patent No.: US 11,011,759 B2
(45) Date of Patent: May 18, 2021

(54) REDOX FLOW BATTERY

(71) Applicant: STANDARD ENERGY CO., LTD., Daejeon (KR)

(72) Inventors: Bu Gi Kim, Daejeon (KR); Ki Hyun Kim, Daejeon (KR); Da Young Kim, Daejeon (KR)

(73) Assignee: STANDARD ENERGY CO., LTD., Daejeon (KR)

( * ) Notice: Subject to any disclaimer, the term of this patent is extended or adjusted under 35 U.S.C. 154(b) by 196 days.

(21) Appl. No.: 15/570,444

(22) PCT Filed: Sep. 30, 2015

(86) PCT No.: PCT/KR2015/010287
§ 371 (c)(1),
(2) Date: Oct. 30, 2017

(87) PCT Pub. No.: WO2016/175400
PCT Pub. Date: Nov. 3, 2016

(65) Prior Publication Data
US 2018/0151894 A1 May 31, 2018

(30) Foreign Application Priority Data
Apr. 30, 2015 (KR) .................. 10-2015-0061825

(51) Int. Cl.
*H01M 8/0273* (2016.01)
*H01M 8/18* (2006.01)
(Continued)

(52) U.S. Cl.
CPC ........... *H01M 8/0273* (2013.01); *H01M 8/02* (2013.01); *H01M 8/0258* (2013.01); *H01M 8/18* (2013.01); *H01M 8/188* (2013.01); *Y02E 60/50* (2013.01)

(58) Field of Classification Search
CPC ... H01M 8/0273; H01M 8/0258; H01M 8/188
See application file for complete search history.

(56) References Cited

U.S. PATENT DOCUMENTS

| 2004/0170893 | A1* | 9/2004 | Nakaishi | ............. | H01M 8/0273 |
| | | | | | 429/185 |
| 2014/0077462 | A1 | 3/2014 | Hong et al. | | |
| 2017/0012299 | A1* | 1/2017 | Itou | ........................ | H01M 8/188 |

FOREIGN PATENT DOCUMENTS

| CN | 103022542 A | 4/2013 |
| CN | 103647099 A | 3/2014 |

(Continued)

OTHER PUBLICATIONS

Machine translation of KR-20140109615-A, Yoon, Korea (Year: 2014).*

(Continued)

*Primary Examiner* — Brian R Ohara
*Assistant Examiner* — Brent C Thomas
(74) *Attorney, Agent, or Firm* — The PL Law Group, PLLC

(57) ABSTRACT

A redox flow battery includes a flow path frame provided with a flow path conveying an electrolyte introduced into a fixing frame having a flow path for introducing and discharging an electrolyte supplied from outside. The flow path frame is provided with an inflow path connected to the flow path of the fixing frame and an outflow path discharging the electrolyte to an impregnation part conveying the electrolyte to a reaction surface of a membrane, thereby preventing leakage of the electrolyte that is caused by a difference between supply pressure and circulation pressure of the electrolyte.

14 Claims, 13 Drawing Sheets

(51) Int. Cl.
*H01M 8/0258* (2016.01)
*H01M 8/02* (2016.01)

(56) References Cited

FOREIGN PATENT DOCUMENTS

| | | | |
|---|---|---|---|
| JP | H087913 A | | 1/1996 |
| JP | 2011525692 A | | 9/2011 |
| KR | 20-0463822 Y1 | | 11/2012 |
| KR | 10-1377187 B1 | | 3/2014 |
| KR | 10-1394255 B1 | | 5/2014 |
| KR | 10-2014-0109615 A | | 9/2014 |
| KR | 20140109615 A | * | 9/2014 |
| KR | 10-1471886 B1 | | 12/2014 |
| KR | 10-2015-0007750 A | | 1/2015 |

OTHER PUBLICATIONS

International Search Report for PCT/KR2015/010287.
European Search Report for EP15890841.8 from European patent office in a counterpart European patent application dated Dec. 17, 2018.
Office action dated Nov. 6, 2018 from Japan Intellectual Property Office in a counterpart Japanese Patent Application No. 2017-556982 (all the cited references are listed in this IDS.) (English translation is submitted herewith).
Negishi, "Redox flow cell", fuel cell, vol. 2, No. 4, pp. 69-74, 2003 (English translation of Abstract is submitted herewith.).
Office action dated Apr. 14, 2020 from Japan Intellectual Property Office in a counterpart Japanese Patent Application No. 2019-071917 (all the cited references are listed in this IDS.) (English translation is submitted herewith).

* cited by examiner

REDOX FLOW BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/010287, filed Sep. 30, 2015, which claims priority to the benefit of Korean Patent Application No. 10-2015-0061825 filed in the Korean Intellectual Property Office on Apr. 30, 2015, the entire contents of which are incorporated herein by reference.

TECHNICAL FIELD

The present invention relates to a redox flow battery. More particularly, the present invention relates to a redox flow battery that can increase a flow rate of an electrolyte by increasing a cross-sectional area of a flow path and can prevent leakage of the electrolyte by doubly sealing the flow path.

BACKGROUND ART

Recently, development of an energy storage system (ESS) has actively progressed, and a secondary battery capable of charging and discharging is spotlighted as an influential technology therefor.

The energy storage system (ESS) is a system storing power generated by thermal power, water power, atomic power, solar power, wind power, tidal power, and stem supply and power generation and supplying the power to a device or a system that requires power. To this end, the energy storage system is configured by a non-battery storage method and a battery-based storage method using a secondary battery such as a LiB battery, a NaS battery, a vanadium redox flow battery (VRFB), a super capacitor, etc.

The vanadium redox flow battery (hereinafter, called 'flow battery') includes a stack composed of a membrane, a frame, etc. in series where reactant reacts in the battery to increase charge capacity, thereby having the function of the secondary battery capable of charging and discharging electric energy.

More specifically, in the flow battery, an anolyte and a catholyte circulate on opposite sides of the membrane and ions are exchanged. In this process, electrons move to cause charging and discharging. Compared to the existing secondary battery, the flow battery has longer lifetime and can be manufactured as a medium and large size system of kW~MW, and thus the flow battery is most appropriate for the energy storage system.

The conventional flow battery is shown in FIGS. 1 to 3.

FIG. 1 is a block diagram simply illustrating a conventional flow battery,

FIG. 2 is a cross-sectional view illustrating a conventional flow battery,

FIG. 3 is a perspective view illustrating a flow path of a conventional flow battery.

Referring to FIGS. 1 to 3, the conventional flow battery includes an electrolyte tank 2 storing an anolyte 20a or a catholyte 20b, a pump 3 generating supply pressure of the electrolyte being supplied from the electrolyte tank 2, and a stack 1 in which electricity is generated by reacting the anolyte 20a with the catholyte 20b.

The stack 1 is composed of several cells 10 and 20 coupled to each other in series therein. Respective cells 10 and 20 include flow path frames 11, 13, 21, and 23 conveying the electrolyte; an impregnation part 50 conveying the anolyte 20a and the catholyte 20b from the flow path frames 11, 13, 21, and 23; membranes 12 and 22 reacting the electrolyte conveyed from the impregnation part 50; and fixing parts fixing the flow path frames 11, 13, 21, and 23 or the membranes 12 and 22.

The cells are the first cell 10 and the second cell 20 stacked with a second fixing part 32 interposed therebetween. Between the first cell 10 and the second cell 20, flow path frames 11, 13, 21, and 23 in which flow paths for the anolyte and the catholyte are formed are stacked at upper and lower sides of respective membranes 12 and 22.

The fixing parts 31, 32, and 33 fix one or more cells of the flow battery. More specifically, the first fixing part 31 is stacked on the upper side of the anode flow path frame 11 of the first cell 10, the second fixing part 32 is provided between the cathode flow path frame 13 positioned below the first cell 10 and the upper side of the anode flow path frame 21 of the second cell 20, and the third fixing part 33 is stacked under the lower side of the cathode flow path frame 23 of the second cell 20.

The flow path frames 11, 13, 21, and 23 will be described with reference to the cathode flow path frame 13 of the first cell 10 and the anode flow path frame 21 of the second cell 20. The flow path frames 11, 13, 21, and 23 are quadrangular frames provided with through holes 13a and 21a at respective corners thereof and impregnation parts 50 defining an empty space at the central portions to convey the electrolyte to the membranes 12 and 22.

Also, the flow path frames 13 and 21 are provided with a flow path grooves 21b inwardly formed at a surface facing the membrane 12 so as to guide the electrolyte 20b conveyed through through holes 13a and 21a to the impregnation parts 50.

Here, through holes 13a, 21a, and 32a are formed on the flow path frames 11, 13, 21, and 23, the fixing parts 31, 32, and 33, and the membranes 12 and 22 composing the first cell 10 and the second cell 20 so as to enable the electrolyte 20b being introduced from the electrolyte tank 2 to be guided to both the first cell 10 and the second cell 20.

With the flow path structure, the conventional flow battery receives the electrolyte from the electrolyte tank 2 through common flow paths 40a and 40b. Here, the anolyte 20a and the catholyte 20b are respectively introduced through an anode common flow path 40a and a cathode common flow path 40b of the common flow path 40a and 40b. For example, the anolyte 20a is introduced into the anode flow path frames 11 and 21 of the first cell 10 and the second cell 20 through the first common flow path 40a, and the catholyte 20b is introduced into the cathode flow path frames 13 and 23 of the first cell 10 and the second cell 20 through the second common flow path 40b.

Here, it is desired that the flow path frames 11, 13, 21, and 23 of each cell 10, 20 are compressed to be sealed such that the anolyte 20a and the catholyte 20b being introduced can be prevented from leaking and mixing.

That is, it is desired that the flow path frames are consolidated such that the anolyte 20a flowing along the anode common flow path 40a is supplied to only the anode flow path frames 11 and 21 of the first cell 10 and the second cell 20 and the anolyte 20a is not be supplied to the cathode flow path frames 13 and 23.

However, the flow path groove 21b formed on a surface of the conventional flow path frame 11, 13, 21, 23 is fixed to a surface of the fixing part 31, 32, 33 by adhesion, and thus there is an unconsolidated portion 32b between the flow path groove 21b and the surface of the fixing part 31, 32, 33.

Therefore, the conventional flow battery is problematic in that an anolyte leaked through the unconsolidated portion 32b between the fixing part 32 and the cathode flow path frame 13 is mixed with a catholyte, and thus performance of the battery is degraded.

SUMMARY

Accordingly, the present invention has been made keeping in mind the above problems occurring in the related art, and the first object of the present invention is to provide a redox flow battery that can prevent leakage of an electrolyte by forming flow paths for the electrolyte on opposite surfaces of a flow path frame and forming an unconsolidated portion having a closed curved surface between a consolidated portion and other part.

The second object of the present invention is to provide a redox flow battery being capable of increasing a flow rate of an electrolyte by increasing a cross-sectional area of a flow path of a flow path frame.

The third object of the present invention is to provide a redox flow battery that distributes a flow path of a flow path frame to evenly distribute an electrolyte in an impregnation part.

In order to accomplish the above object, the present invention provides a redox flow battery including a membrane provided with opposite surfaces that react an electrolyte conveyed thereto; at least one flow path frame laminated on the opposite surfaces of the membrane to respectively convey an anolyte and a catholyte of the electrolyte; an impregnation part conveying to the membrane the electrolyte being supplied through the flow path frame; and at least one fixing part fixing the membrane or the flow path frame, wherein the membrane or the fixing part is provided with a through hole forming a common flow path conveying the electrolyte, and the flow path frame is provided with an inflow path conveying the electrolyte being introduced through the common flow path to an opposite surface and an outflow path conveying the electrolyte received from the inflow path to the impregnation part.

Also, in the present invention, the inflow path and the outflow path of exemplary embodiments are formed in different surfaces of the flow path frame.

According to the redox flow battery of the present invention described above, it is possible to prevent leakage of the electrolyte by forming at least one leakage preventing part at the flow paths formed on opposite surface of the flow path frame.

Also, the present invention can prevent leakage of the electrolyte by forming an unconsolidated portion having an empty space as a closed curved surface between consolidated portions when the flow path frame and other parts are laminated.

Also, the present invention can increase a flow rate of the electrolyte by laminating at least one leakage preventing part on the flow path frame and increasing a cross-sectional area of a flow path of the flow path frame.

Also, the present invention can evenly distribute the electrolyte over the impregnation part by extending, dividing, or merging the flow paths formed on the opposite surfaces of the flow path frame.

DETAILED DESCRIPTION

Terms are described for detailed description of the present invention.

A 'reaction surface side' means a surface of opposite surfaces of a flow path frame, the surface facing a reaction surface of a membrane.

'Reaction surfaces' mean opposite surfaces of the membrane in which an electrolyte reacts.

A 'fixing part side' means a surface of opposite surfaces of the flow path frame, the surface facing a fixing part.

'Electrolyte' means an anolyte and a catholyte being supplied from an external electrolyte tank. Hereinafter, the electrolyte is a generic term for the anolyte and the catholyte.

Hereinafter, a redox flow battery according to the present invention will be described in detail by using the above-described terms.

Figure 1:
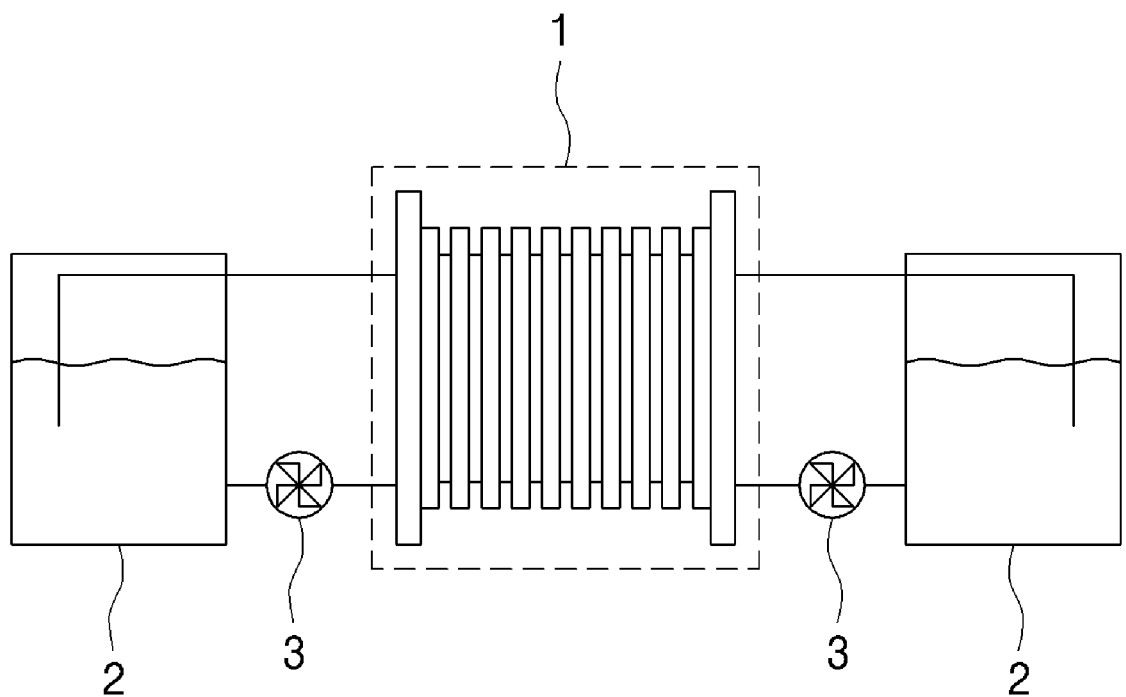
FIG. 1 is a block diagram illustrating a conventional redox flow battery.
Figure 2:
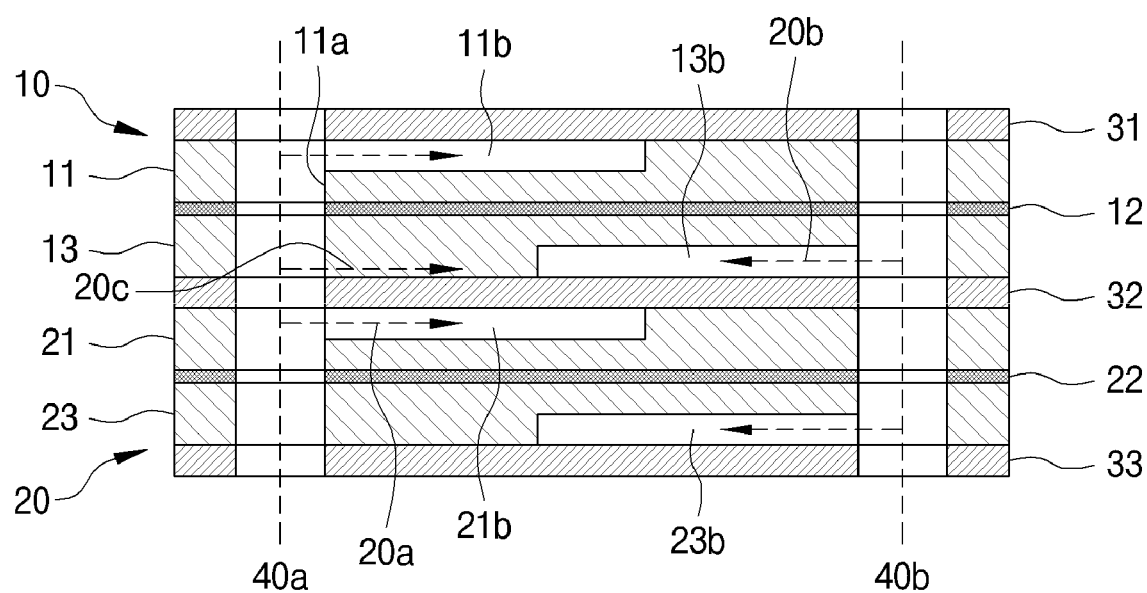
FIG. 2 is a cross-sectional view illustrating a conventional redox flow battery.
Figure 3:
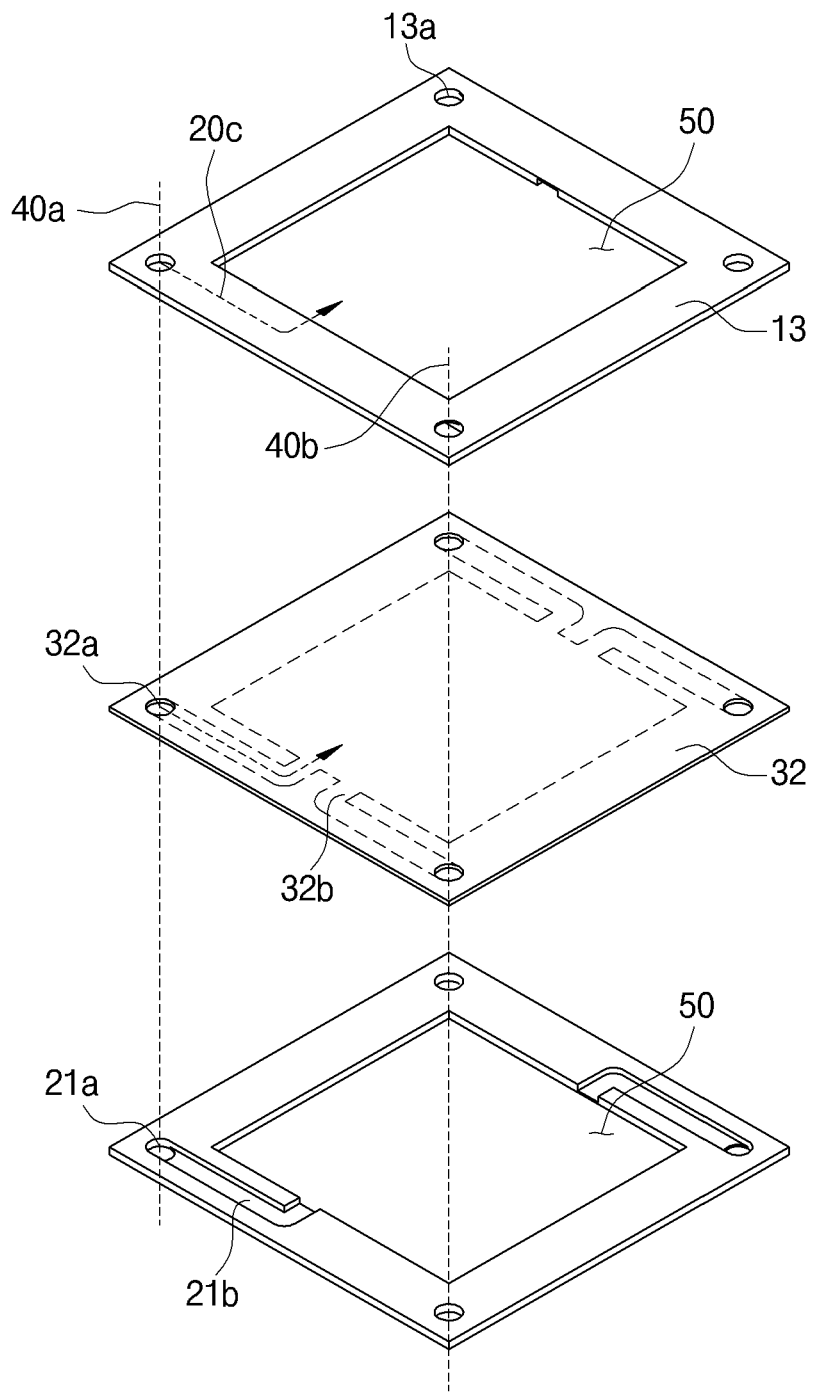
FIG. 3 is a perspective view illustrating a conventional redox flow battery.
Figure 4:
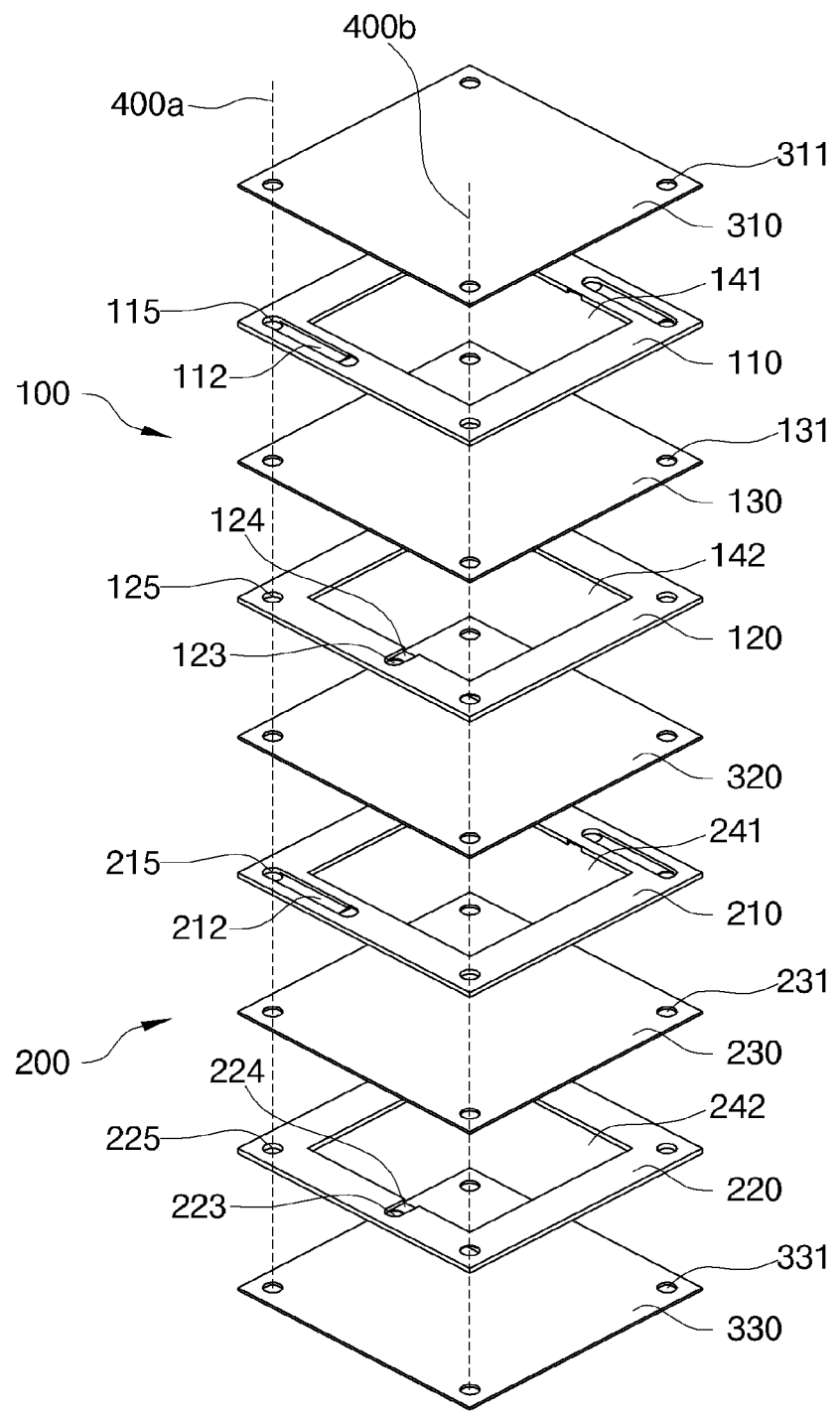
FIG. 4 is an exploded perspective view illustrating a first exemplary embodiment of a redox flow battery according to the present invention.

FIG. 4 is an exploded perspective view illustrating a first exemplary embodiment of a redox flow battery according to the present invention.

Referring to FIG. 4, the redox flow battery according to the present invention includes one or more cells, fixing parts 310, 320, and 330 fixing one or more cells, and an anode common flow path 400a and a cathode common flow path 400b that are commonly connected to one or more cells and through which the anolyte and the catholyte are conveyed.

The anode common flow path 400a and the cathode common flow path 400b are formed as through holes connected in each cell 100, 200 to convey the electrolyte being supplied from respective an anolyte tank 2 and a catholyte tank 2. Hereinafter, common flow paths 400a and 400b are used as generic terms therefor.

The fixing parts 310, 320, and 330 fix one or more cells 100 and 200 to laminate the cells that are made of one selected from a polymer group including at least one of PE, PP, PC, and PVC and an elastic material group including at least one of VITON, TYGON, silicon or include first to third fixing parts 310, 320, and 330 to fix the cells 100 and 200 by separating the cells.

More specifically, the first fixing part 310 and the third fixing part 330 are respectively fixed to the upper surface and the lower surface of the laminated cells, and fix one or more cells that are laminated therebetween. Also, the second fixing part 320 insulates a space between cells 100 and 200 composing the battery. That is, the fixing parts 310, 320, and 330 of the present invention include a separating plate insulating the space between the cells 100 and 200 and a fixing frame fixing one or more cells being laminated. Since the separating plate and the fixing frame are known in the art, detailed descriptions thereof will be omitted, and fixing parts 310, 320, and 330 are generic terms therefor.

There is one or more cells 100 and 200, the cells 100 and 200 respectively include: anode flow path frames 110 and 210 in which flow paths conveying the anolyte are formed; cathode flow path frames 120 and 220 in which flow paths conveying the catholyte are formed; membranes 130 and 230 reacting the electrolyte through the anode flow path frames 110 and 210 and the cathode flow path frames 120 and 220; and impregnation parts 141, 142, 241, and 242 conveying the electrolyte to the membrane 130 from the anode flow path frames 110 and 210 and the cathode flow path frames 120 and 220.

The impregnation parts 141, 142, 241, and 242 are formed as empty spaces at the center portions of the anode flow path frames 110 and 210 and the cathode flow path frames 120 and 220, and convey the electrolyte conveyed through the flow paths formed in the anode flow path frames 110 and 210 the cathode flow path frames 120 and 220 to the reaction surface of the membranes 130 and 230.

Here, the impregnation parts 141, 142, 241, and 242 are described as empty spaces formed in the flow path frames 120, 120, 130, and 230, but may include materials in which it is easy for the electrolyte to flow such as felt, fiber, foam, mesh, etc. if necessary.

The membranes 130 and 230 react with the anolyte introduced through the impregnation parts 141, 142, 241, and 242 of the anode flow path frames 110 and 210, and convey hydrogen ions to the impregnation parts 141, 142, 241, and 242 of the cathode flow path frames 120 and 220.

The anode flow path frames 110 and 210 the cathode flow path frames 120 and 220 guide the electrolyte supplied through the common flow paths 400a and 400b to the impregnation parts 141, 142, 241, and 242. The anode flow path frames 110 and 210 the cathode flow path frames 120 and 220 may be formed of one selected from a polymer group including at least one of PE, PP, PC, and PVC and an elastic material group including at least one of VITON, TYGON, and silicon.

Here, the anode flow path frames 110 and 210 and the cathode flow path frames are laminated such that respective surfaces thereof facing the reaction surface side of the membrane 130 face each other. For example, when upper surfaces of the anode flow path frames 110 and 210 are laminated to face first reaction surfaces of the membranes 130 and 230, lower surfaces of the cathode flow path frames 120 and 220 are laminated to face second reaction surfaces of the membranes 130 and 230. The structures of the anode flow path frames 110 and 210 the cathode flow path frames 120 and 220 are the same, and thus the anode flow path frame 110 of the first cell 100 will be described with reference to FIGS. 5 and 7, and is called the flow path frame 110.

Figure 5:
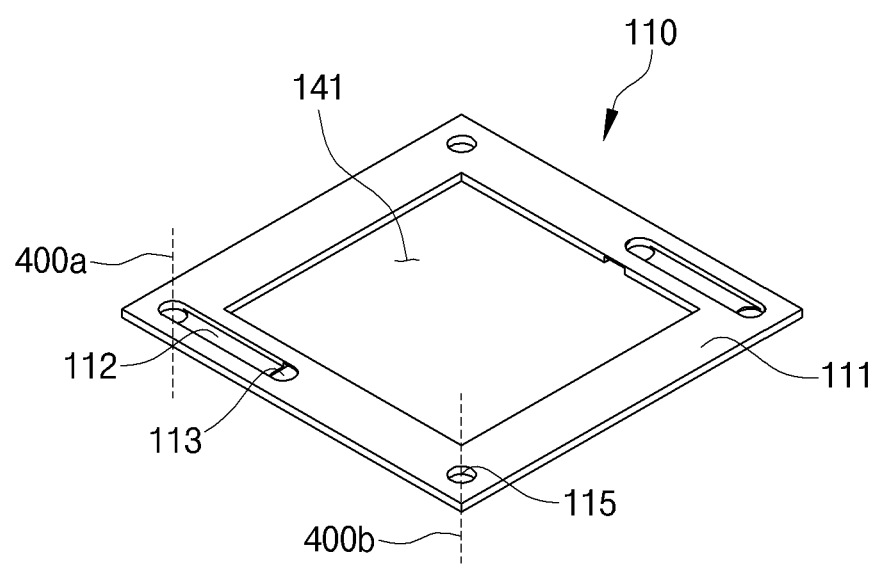
FIGS. 5 and 6 are perspective views illustrating a surface of a flow path frame of a redox flow battery according to the present invention.
Figure 7:
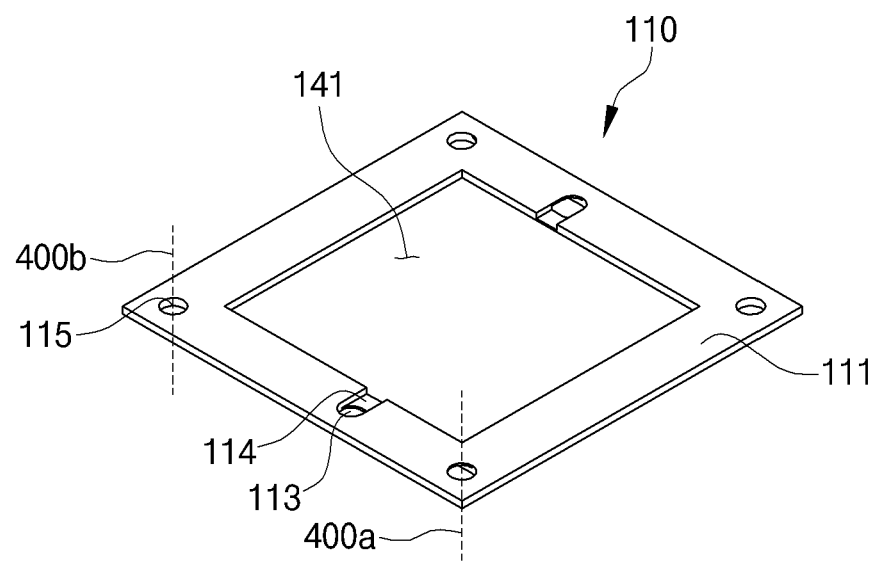
FIG. 7 is a perspective view illustrating the opposite surface of the flow path frame of the redox flow battery according to the present invention.

FIG. 5 is a perspective view illustrating a surface of a flow path frame of a redox flow battery according to the present invention, and FIG. 7 is a perspective view illustrating the opposite surface of the flow path frame.

Referring to FIGS. 5 and 7, the flow path frame 110 includes: a frame body 111 formed as extending in horizontal and vertical directions by having an empty space in which the impregnation part 141 is formed at the central portion; a plurality of through holes 115 formed through the frame body 111 to form the anode common flow path 400a and the cathode common flow path 400b; a flow path groove 112 formed by inwardly extending at a surface; a flow path hole 113 penetratedly formed to be connected to the flow path groove 112; and an outflow groove 114 inwardly formed to extend from the flow path hole 113.

The frame body 111 is connected in horizontal and vertical directions by having an empty space in which the impregnation part 141 is formed. The shape of the frame body 111 may vary depending on the choice of designers or operators, and thus it is not limited to the detailed description or drawings.

A plurality of through holes 115 are formed through the frame body 111. Here, the through holes 115 are formed to be equal to the through holes 311, 321, and 331 of the fixing parts 310, 320, and 330, and the through holes 131 and 231 of the membranes 130 and 230. That is, when the flow path frames 110, 120, 210, and 220, the membranes 130 and 230, and the fixing parts 310, 320, and 330 are laminated, the through holes 115 are connected to form the common flow paths 400a and 400b through which the electrolyte being supplied from the electrolyte tank 2 is provided.

The flow path groove 112 is formed as an inward groove extending from the through hole 115 in a direction to guide the electrolyte conveyed through the common flow paths 400a and 400b. Here, the flow path formed on the flow path frame 110 of the present invention extends from the flow path groove 112 to the flow path hole 113, thereby having a closed curved surface within the frame body 111.

The flow path hole 113 is penetratedly formed to the opposite surface from the end of the flow path groove 112 extending from the through hole 115. Accordingly, the flow path hole 113 conveys the electrolyte conveyed through the flow path groove 112 to the opposite surface.

The outflow groove 114 is formed as an inward groove at the opposite surface of the flow path frame 110 to convey the electrolyte to the impregnation part 141. Accordingly, the outflow groove 114 guides the electrolyte introduced through the flow path hole 113 to the impregnation part 141.

That is, the flow path frame 110 of the present invention is provided with an inflow path guiding through the through hole 115 and the flow path groove 112 the electrolyte introduced through the common flow paths 400a and 400b, and an outflow path conveying the electrolyte to the impregnation part 141 through the flow path hole 113 and the outflow groove 114.

As described above, the inflow path and the outflow path formed on different surfaces may form an unconsolidated portion by a closed curved surface when being laminated with the fixing part, and description thereof will be described later.

Also, in the present invention, the electrolyte conveyed to the impregnation part 141 may be divided. This will be described with reference to FIG. 6.

Figure 6:
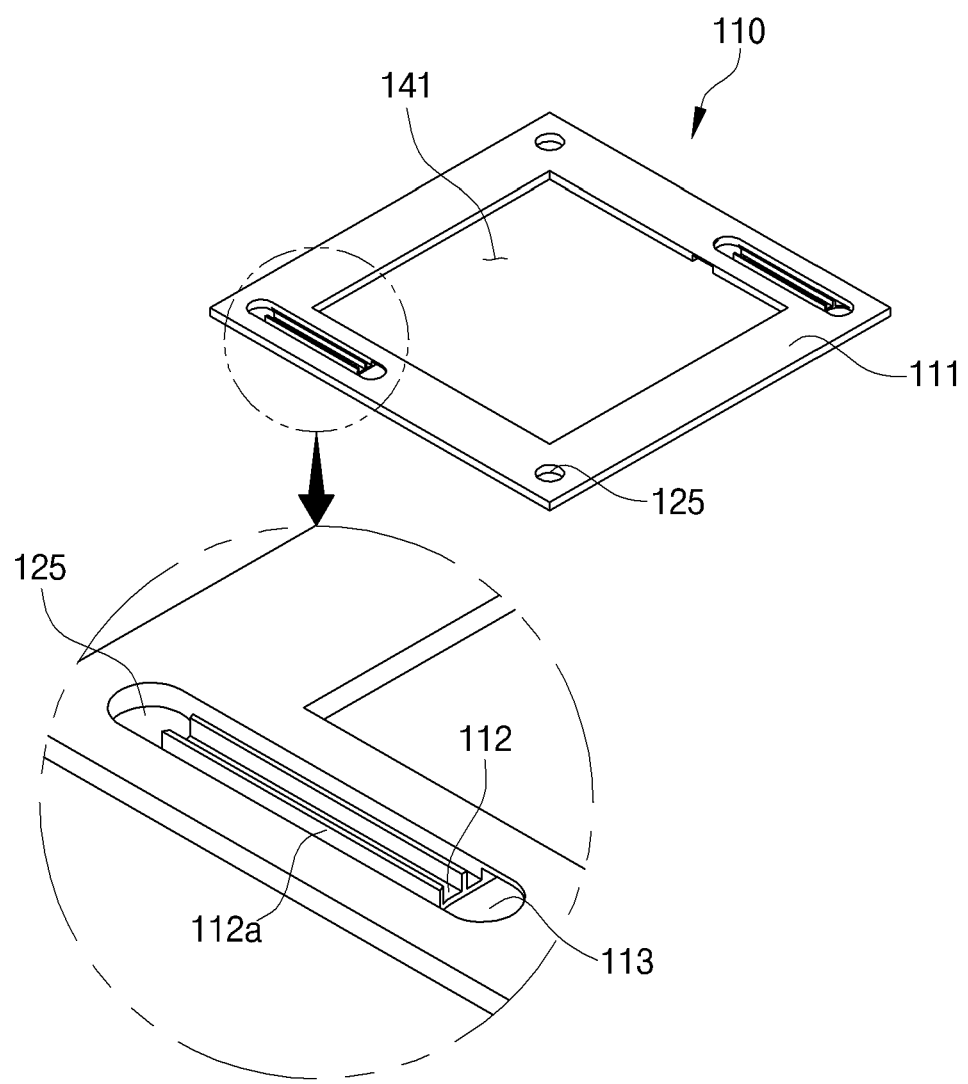

Referring to FIG. 6, the flow path frame 110 includes a flow path groove 112 being formed as an inward groove and a division wall 112a upwardly protruding from the bottom surface of the flow path groove 112.

The division wall 112a upwardly protrudes from the bottom surface of the flow path groove 112 and extends in a direction. At least two division walls are formed by being spaced apart from each other. That is, the division walls 112a are spaced from each other on the bottom surface of the flow path groove 112, whereby flow paths for the electrolyte moving by being divided are formed therebetween.

Accordingly, the division walls 112a divide the electrolyte introduced through the common flow paths 400a and 400b formed by the through hole 115, and convey the electrolyte to the outflow groove 114 through the flow path hole 113. Accordingly, since the electrolyte is conveyed to the impregnation part 141 through the divided inflow paths regardless of increasing in supply, the electrolyte can be evenly conveyed to each cell.

Therefore, according to the first exemplary embodiment of the present invention, it is possible to evenly convey the electrolyte by forming flow paths on the opposite surfaces of the flow path frame 110. Also, by forming the inflow path as a closed curved surface, it is possible to prevent leakage of the electrolyte from an unconsolidated portion 324 of the flow path frame 110, which was a conventional problem. The prevention of leakage of the electrolyte from the flow path frame will be described with reference to FIGS. 8 and 9.

Figure 8:
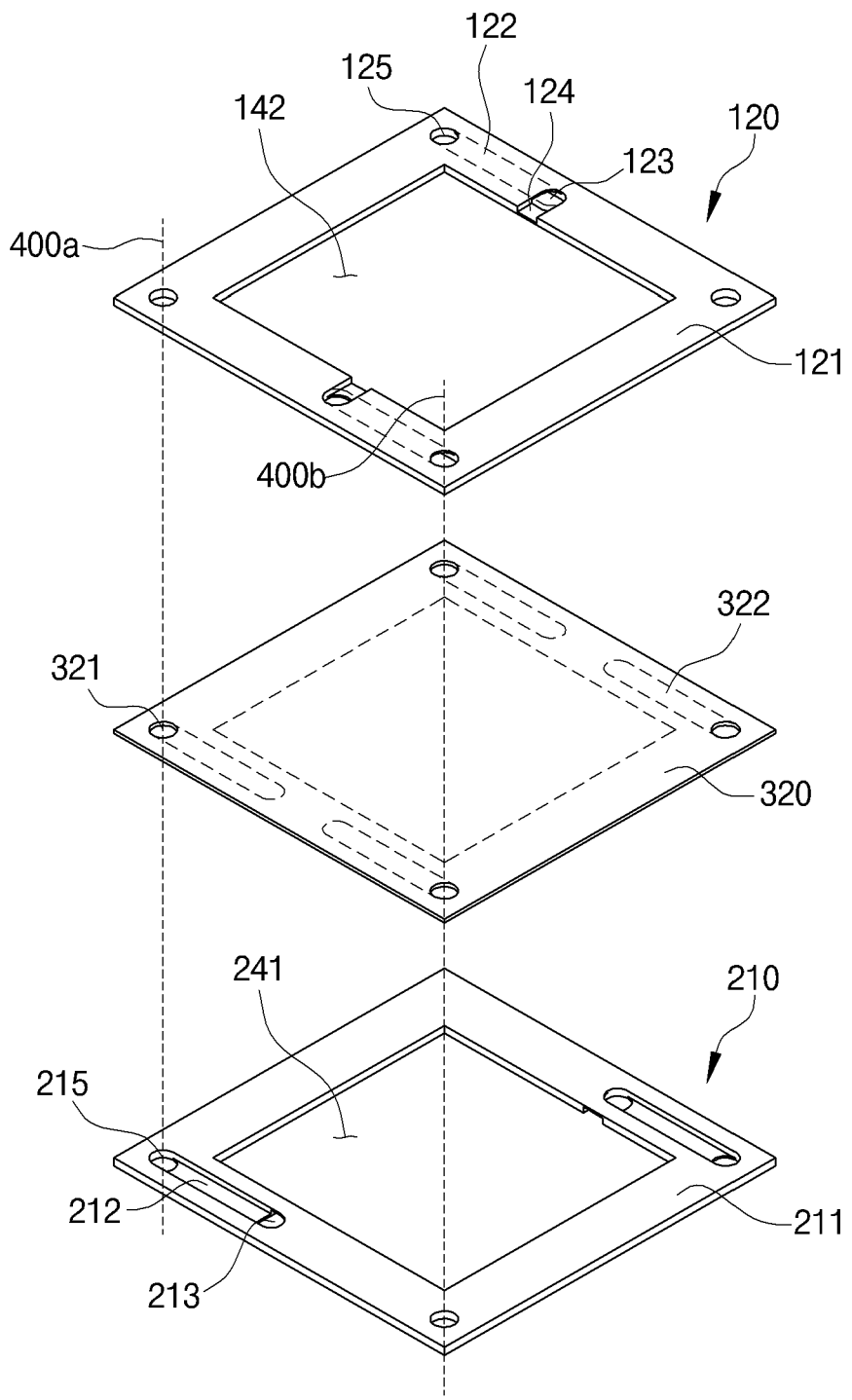
FIG. 8 is an exploded perspective view illustrating a laminated structure of a flow path frame and a fixing part of the redox flow battery according to the present invention.
Figure 9:
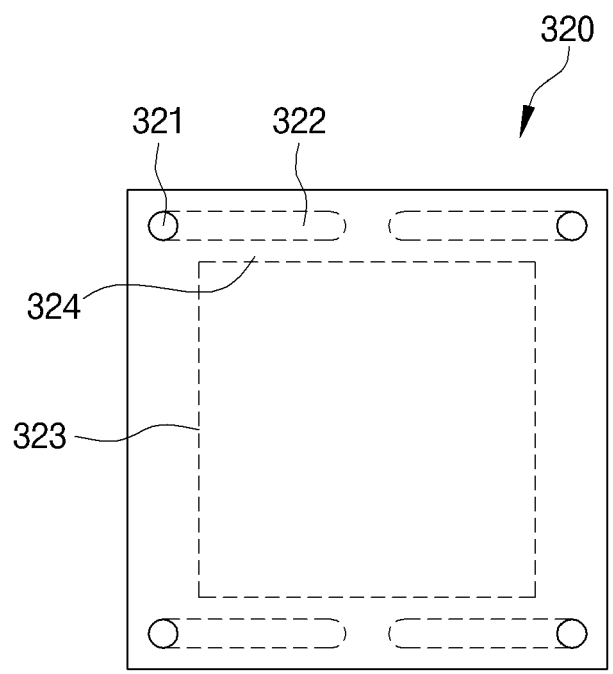
FIG. 9 is a plan view illustrating an unconsolidated portion of a fixing part of a redox flow battery according to the present invention.

FIG. 8 is an exploded perspective view illustrating a laminated structure of a flow path frame and a fixing part of the redox flow battery according to the present invention, and FIG. 9 is a plan view illustrating a consolidated portion of a fixing part of a redox flow battery according to the present invention.

Here, FIG. 8 illustrates an example of a laminated structure of the cathode flow path frame 120 of the first cell 100, the anode flow path frame 210 of the second cell 200, and the second fixing part 320, and is used to describe an electrolyte leakage prevention action of the present invention.

The cathode flow path frame 120 of the first cell 100 is laminated on a surface of the second fixing part 320, and the anode flow path frame 210 of the second cell 200 is laminated on the opposite surface of the second fixing part 320. Here, the anode flow path frame 210 and the cathode flow path frame 120 are laminated to respectively attach surfaces in which inflow paths composed of through holes 125 and 215 and flow path grooves 122 and 212 are formed, to the opposite surfaces of the second fixing part 320.

Thus, due to the inflow paths and the impregnation parts 142 and 241, portions defining empty spaces (hereinafter, called unconsolidated portions 322 and 323) are formed at the opposite surfaces of the second fixing part 320 between the flow path frames 120 and 210. A consolidated portion 324 being tightly attached to the flow path frame 210 is formed by pressure at the remaining portions.

Here, the unconsolidated portions 322 and 323 formed on the second fixing part 320 have closed curved surfaces on a plane as shown in FIG. 9. That is, the inflow path is formed independently of the unconsolidated portion 322 having a closed curved surface by the flow path groove 112 inwardly extending from the through hole to the flow path hole 113, and the unconsolidated portion 323 caused by the impregnation parts 141, 142, and 143 is formed independently of the consolidated portion 324.

Therefore, in the present invention, the unconsolidated portions 322 and 323 by the inflow path have independent closed curved surfaces, and there is the consolidated portion 324 therebetween, thereby preventing leakage of the electrolyte through the unconsolidated portions 322 and 323.

That is, in the present invention, the inflow path and the outflow path are formed at the flow path frames 120 and 210, and unconsolidated portions 322 and 323 are formed as closed curved surfaces when being tightly attached with the fixing part 320 on opposite surfaces. Thus, even though supply pressure of the electrolyte conveyed through the common flow paths 400a and 400b is high, leakage of the electrolyte can be prevented by existing the consolidated portion 324 between the unconsolidated portions 322 and 323 having closed curved surfaces.

Also, as described above, the present invention includes a second exemplary embodiment in which a leakage preventing part is provided in addition to the first exemplary embodiment in which the unconsolidated portions 322 and 323 have closed curved surfaces. The second exemplary embodiment of the present invention will be described with reference to FIGS. 10 and 11.

Figure 10:
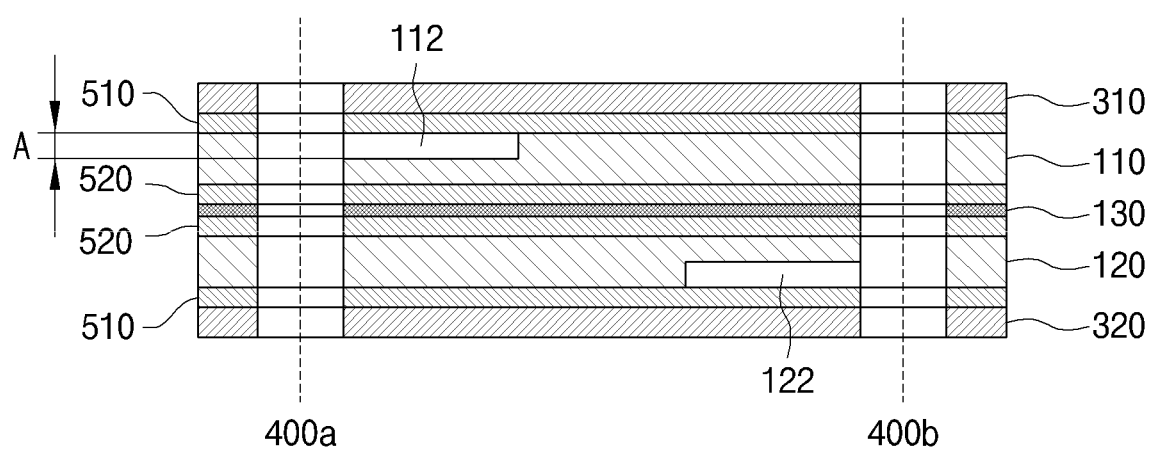
FIG. 10 is a cross-sectional view illustrating a second exemplary embodiment of a redox flow battery according to the present invention.

FIG. 10 is a cross-sectional view illustrating a second exemplary embodiment of a redox flow battery according to the present invention. The second exemplary embodiment will be described with reference to the first cell of the first exemplary embodiment.

Referring to FIG. 10, the first cell 100 includes a first fixing part 310, an anode flow path frame 110, a membrane 130, a cathode flow path frame 120, and a second fixing part 320. Here, in the second exemplary embodiment, a leakage preventing part for preventing leakage of the electrolyte of the anode flow path frame 110 and the cathode flow path frame 120 is further included.

The leakage preventing part includes at least one selected from an adhesive attaching the flow path frames 110 and 120 to the membrane 130 or attaching the flow path frames 110 and 120 to the fixing parts 310 and 320, a gasket laminated on opposite surfaces or one selected surface of the flow path frame 110, and an O-ring.

Hereinafter, a second exemplary embodiment in which a gasket is applied will be described.

The leakage preventing part is composed of a first gasket 510 laminated between the fixing parts 310 and 320 and the flow path frames 110 and 120 to seal therebetween, and a second gasket 520 laminated between the flow path frames 110 and 120 and the membrane 130.

The first gasket 510 is laminated between the first fixing part 310 and the anode flow path frame 110, and between the second fixing part 320 and the cathode flow path frame 120. The second gasket 520 is laminated between the anode flow path frame 110 and the membrane 130, and between the cathode flow path frame 120 and the membrane 130.

According to the structure of the second exemplary embodiment, a pair of gaskets laminated with the flow path frame 110 interposed therebetween is provided in the first exemplary embodiment such that it is possible to doubly prevent leakage of the electrolyte with the unconsolidated portions 322 and 323 having closed curved surfaces.

Moreover, it is desirable that the fixing parts 310 and 320 or the leakage preventing part is fixed by pneumaticity, hydraulic pressure, mechanical fasteners such as bolts or nuts.

More preferably, the fixing parts 310 and 320 or the leakage preventing parts 510 and 520 are provided with surfaces being attached to each other in which protrusions (not shown) that can be combined with each other are formed, thereby increasing mechanical fastening force.

For example, the flow path frames 110 and 120 are provided on a surface thereof with at least one 'n' shaped protrusion. The gaskets 510 and 520 being tightly attached with the flow path frames 110 and 120 and the leakage preventing parts and/or fixing parts 310 and 320 are provided on a surface thereof with an 'u' shaped groove into which the 'n' shaped protrusion can be inserted. The protrusion structure enhances the coupling between the fixing parts 310, 320, and 330, and the flow path frames 110 and 120 and the leakage preventing parts 510 and 520, thereby preventing separation caused by the supply pressure of the electrolyte.

Also, the present invention includes the third exemplary embodiment in which flow rate can be increased by increasing cross-sectional areas of flow paths of the flow path frames 110, 120, 210, and 220. The third exemplary embodiment will be described with reference to FIGS. 11 to 14.

Figure 11:
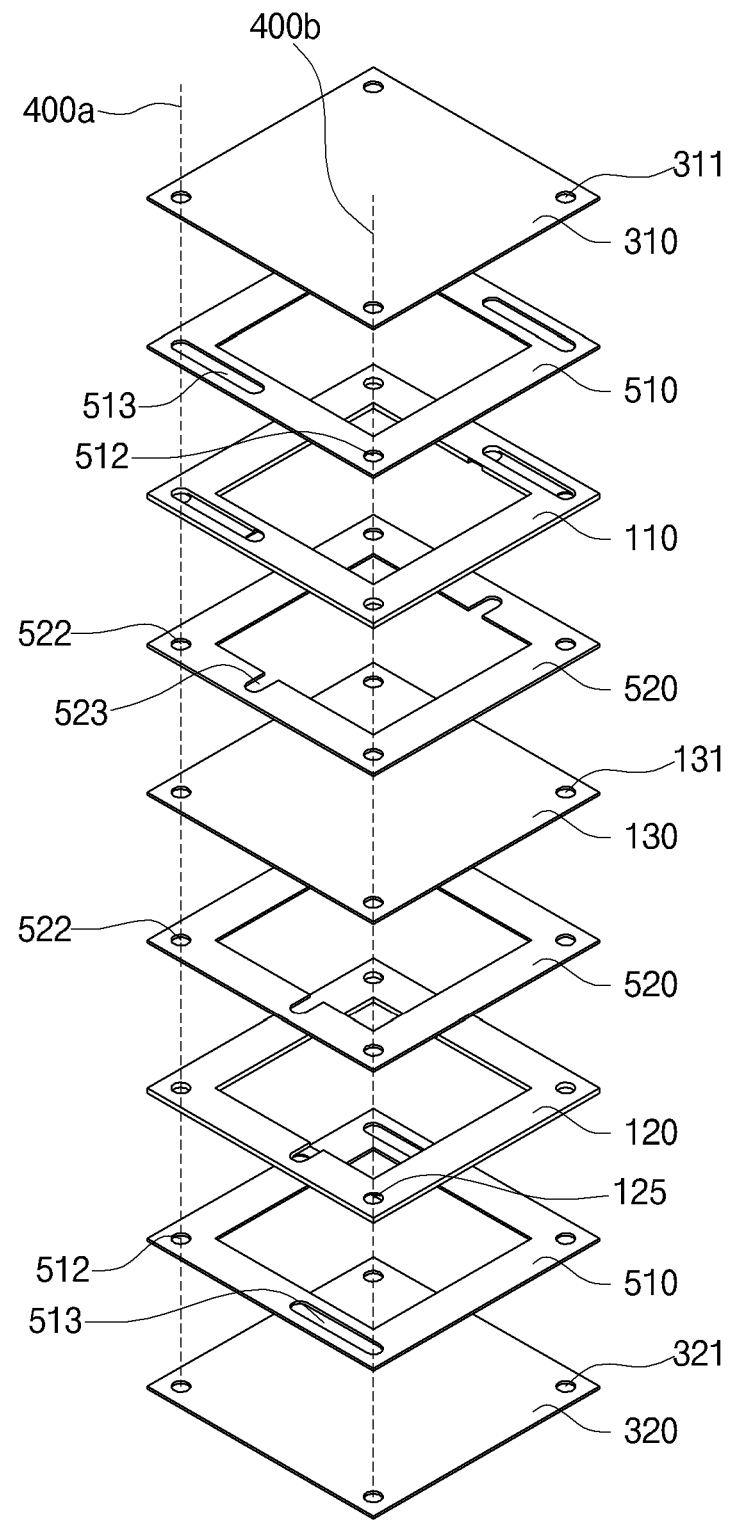
FIG. 11 is an exploded perspective view illustrating a third exemplary embodiment of a redox flow battery according to the present invention.
Figure 12:
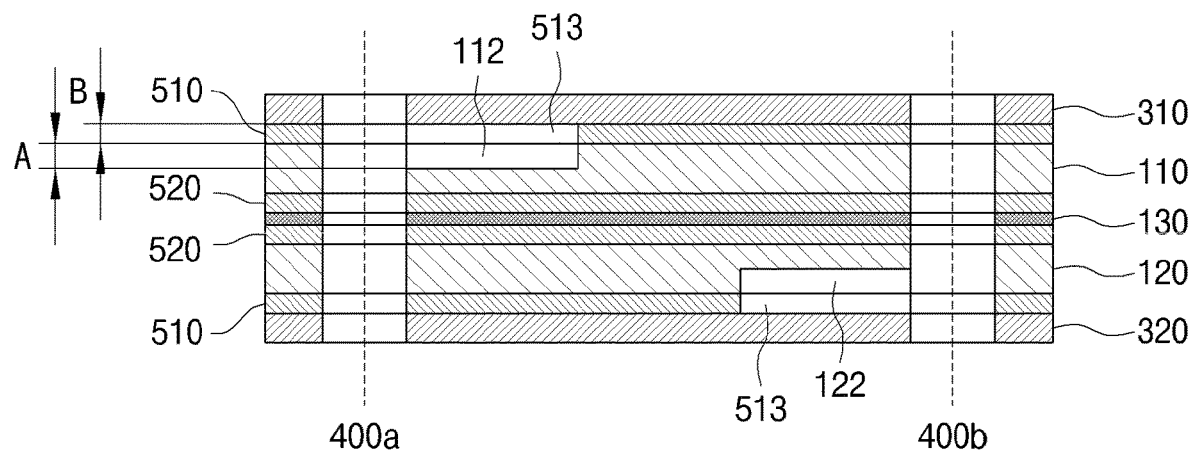
FIG. 12 is a cross-sectional view illustrating the third exemplary embodiment of the redox flow battery according to the present invention.
Figure 13:
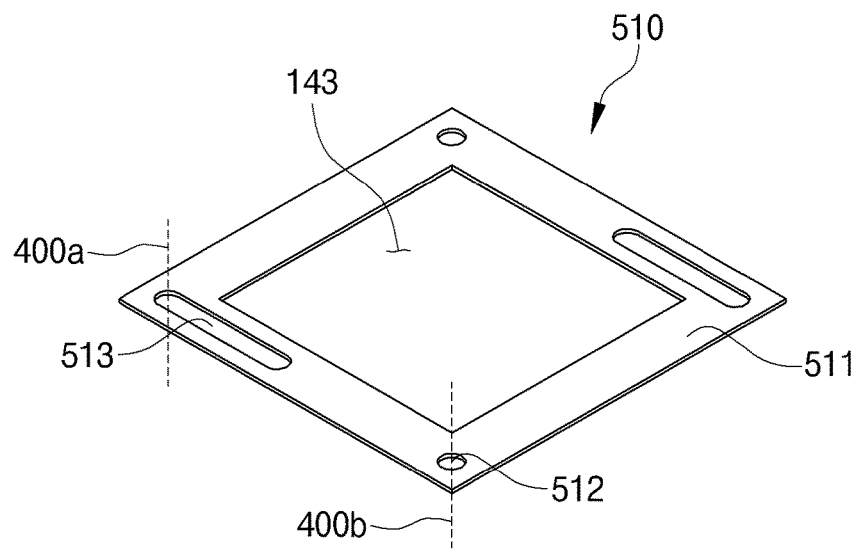
FIGS. 13 and 14 are perspective views illustrating a leakage preventing part of the third exemplary embodiment of the redox flow battery according to the present invention.
Figure 14:
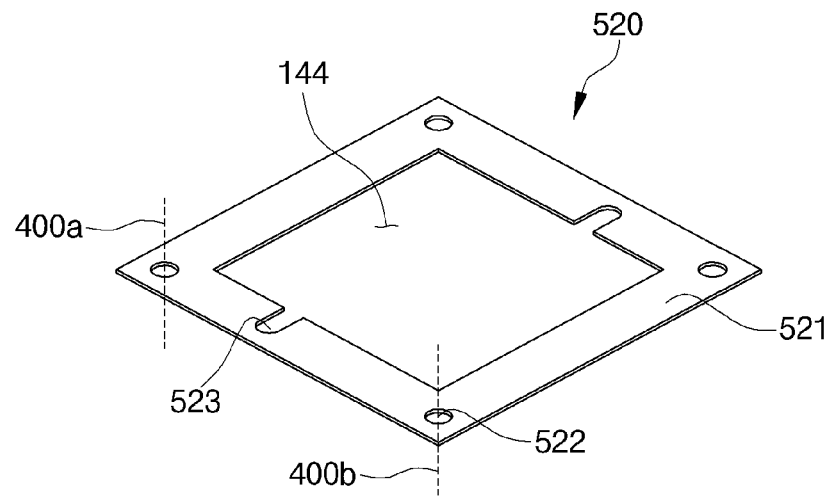

FIG. 11 is an exploded perspective view illustrating a third exemplary embodiment of a redox flow battery according to the present invention, FIG. 12 is a cross-sectional view illustrating the third exemplary embodiment, FIGS. 13 and 14 are perspective views illustrating a leakage preventing part.

Referring to FIGS. 11 to 14, the third exemplary embodiment includes the first fixing part 310, the anode flow path frame 110, the membrane 130, the cathode flow path frames 120 and 220, the second fixing part 320, leakage preventing parts laminated between the anode flow path frame 110 and the cathode flow path frames 120 and 220.

The leakage preventing part is composed of the first gasket 510 laminated between the fixing parts 310, 320, and 330 and the flow path frame 110 to seal therebetween, and the second gasket 520 laminated between the flow path frame 110 and the membrane 130.

The first gasket 510 is laminated between the first fixing part 310 and the anode flow path frame 110, and between the second fixing part 320 and the cathode flow path frames 120 and 220. The second gasket 520 is laminated between the anode flow path frame 110 and the membrane 130, and between the cathode flow path frames 120 and 220 and the membrane 130. That is, the first gasket 510 and the second gasket 520 are laminated with the flow path frame 110 interposed therebetween.

Here, the first gasket 510 includes: a first gasket body 511 connected in lateral and longitudinal directions; through holes 512 forming the common flow paths 400a and 400b by being formed through the first gasket body 511; and first cutout holes 513 extending in a direction from the through holes 512 by being cut out.

The first gasket body 511 is in the same shape as the frame body 111, and is formed as extending in horizontal and vertical directions by having an empty space in which the impregnation part 143 is formed at the central portion.

There are one or more through holes 512 formed on the first gasket body 511, and the through holes 512 are connected to the through holes 115, 125, 311, 321, and 313 formed on the flow path frames 110 and 120 the fixing parts 310, 320, and 330, thereby forming the common flow paths 400a and 400b.

The first cutout holes 513 are located in diagonal directions on the first gasket body 511, and are provided in shape extending from the through hole 512 on a surface and being cut out. Here, the first cutout hole 513 has been described as having a length and shape equal to the length and shape of the inflow path of the flow path frames 110 and 120, but it is not limited thereto.

That is, in the present invention, the cutout hole 513 may be larger or smaller than the length and shape of the inflow path without damaging the closed curved surfaces of the unconsolidated portions 322 and 323, or may be completely removed from the plane such that the penetrated shape or a part on a plane may be cut out and thickness of the cross section may be changed.

Therefore, the first gasket 510 is laminated to a surface in which the inflow paths of the flow path frames 110 and 120 are formed. Here, as the first cutout hole 513 is located above the inflow path, the height A of the inflow path is increased by the thickness B. Thus, the first gasket 510 may consolidate the space between the flow path frames 110 and 120 and the fixing parts 310, 320, and 330, and may increase cross-section areas of the inflow paths by increasing the heights A and B of the inflow paths.

The second gasket 520 includes a second gasket body 521 having an empty space in which the impregnation part 144 is formed at the central portion, through holes 522 forming the common flow paths 400a and 400b, and second cutout holes 523 being cut out from the gasket body 521.

The second gasket body 521 is provided in a shape that is equal to the first gasket body 511, and has an empty space in which the impregnation part 144 is formed at the central portion.

One or more through holes 522 are formed through the second gasket body 521 to form the common flow paths 400a and 400b. Here, the first gasket body 511 and the second gasket body 521 are manufactured in the same shape as and/or are formed in the same positions as the through holes 115, 125, 131, 311, 321, and 331 formed on the flow path frame 110, the fixing parts 310, 320, and 330, and the membrane 130, thereby forming the anode common flow path 400a and the cathode common flow path 400b.

The second cutout hole 523 on the second gasket body 521 is cut out at the same positions as the outflow grooves 114 and 124 of the flow path frames 110 and 120 as being open to the impregnation part 14. That is, the second cutout holes 523 are formed at the same positions as the outflow grooves 114 and 124 of the flow path frames 110 and 120 such that the heights of the outflow paths are increased, and cross-sectional areas of the flow paths are increased.

Therefore, in the third exemplary embodiment of the present invention, the first gasket 510 and the second gasket 520 include the first cutout hole 513 and the second cutout hole 523 to increase the heights of the inflow path and the outflow path of the flow path frames 110 and 120. Thus, the flow rate of the electrolyte conveyed to the impregnation parts 141, 142, 143, and 144 through the common flow paths 400a and 400b can be increased by increasing cross-sectional areas of the flow paths.

Also, the present invention includes a fourth exemplary embodiment in which the common flow paths 400a and 400b are formed in zigzag shapes such that the electrolyte is evenly impregnated in the impregnation parts 141, 142, 143, and 144. The fourth exemplary embodiment will be described with reference to FIGS. 15 to 17.

Figure 15:
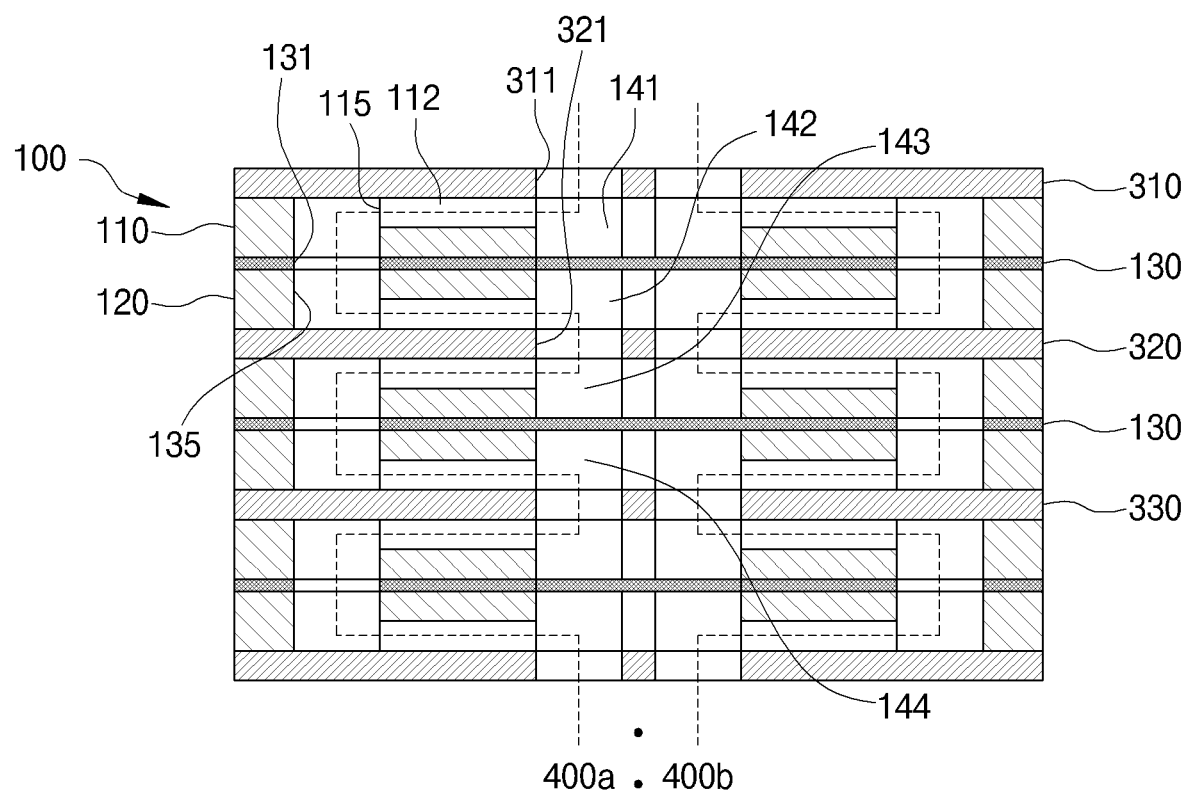
FIG. 15 is a cross-sectional view illustrating a fourth exemplary embodiment of a redox flow battery according to the present invention.

FIG. 15 is a cross-sectional view illustrating a fourth exemplary embodiment of a redox flow battery according to the present invention.

Referring to FIG. 15, in the fourth exemplary embodiment of the present invention, at least one cell includes the anode flow path frame 110, the cathode flow path frame 120, and the membrane 130, the cell being compressed and fixed by the fixing parts 310, 320, and 330 connected in series and laminated on the upper and lower sides.

Here, in the fourth exemplary embodiment, there are the anode common flow path 400a conveying the anolyte being supplied from the anolyte tank 2, and the cathode common flow path 400b conveying the catholyte being supplied from the catholyte tank 2.

Here, the anode common flow path 400a and the cathode common flow path 400b of the fourth exemplary embodiment are formed to make a distance between the inflow hole into which the electrolyte is introduced and the outflow hole (for example, through holes of the fixing parts located at the outermost portions of the opposite sides) to be out of the shortest distance. That is, in the fourth exemplary embodiment, the common flow path is formed in a zigzag shape. The common flow paths 400a and 400b are described with reference to the first cell 100.

Figure 16:
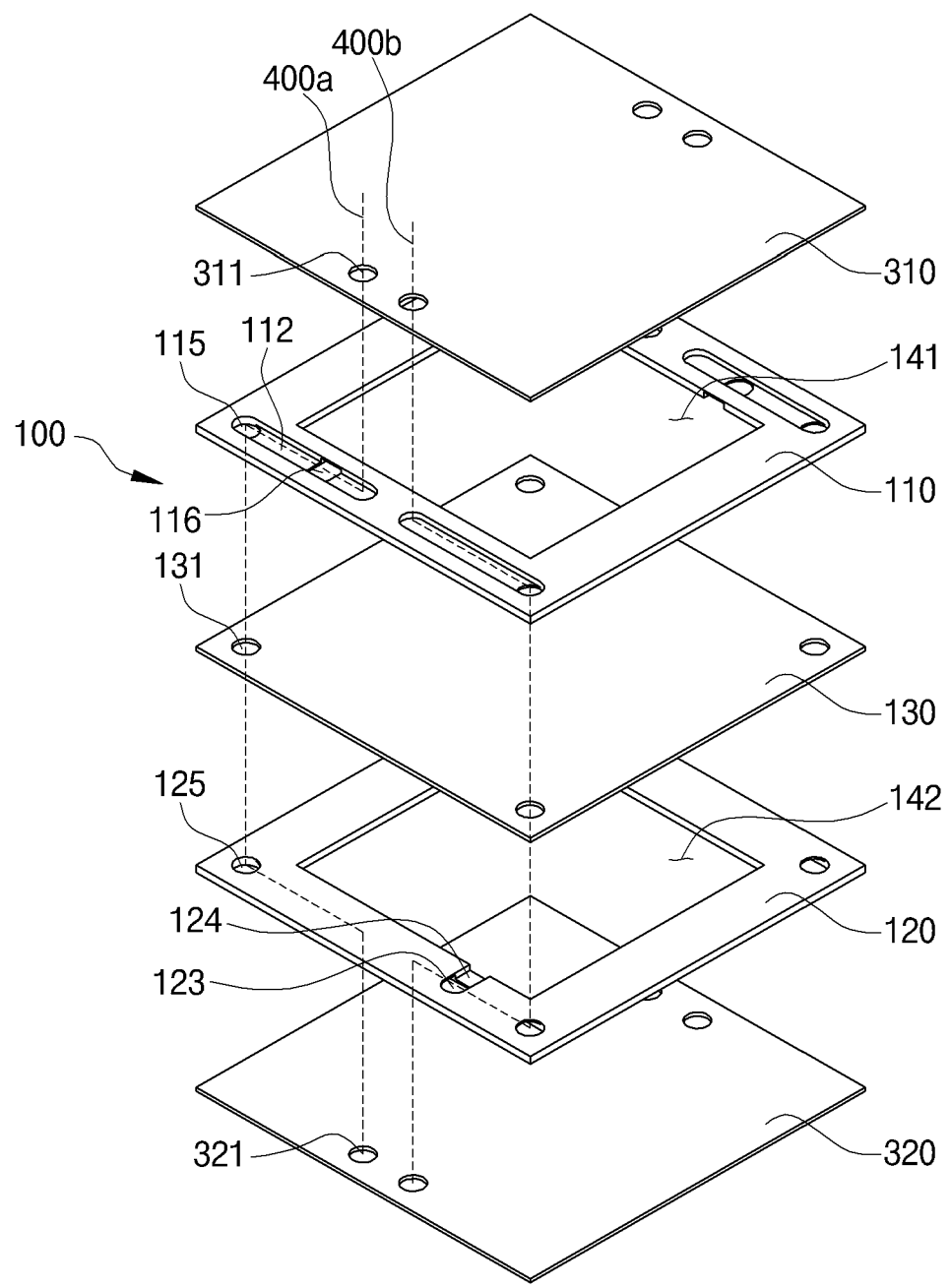
FIG. 16 is an exploded perspective view illustrating a first cell of the fourth exemplary embodiment of the redox flow battery according to the present invention.

FIG. 16 is an exploded perspective view illustrating a first cell of the fourth exemplary embodiment of the redox flow battery according to the present invention.

Referring to FIG. 16, in the fourth exemplary embodiment, the first cell 100 includes the first fixing part 310, the anode flow path frame 110 conveying the anolyte to the impregnation part 141, the cathode flow path frame 120 conveying the catholyte to the impregnation part 142, the membrane 130 having opposite surfaces that react the anolyte and the catholyte being respectively conveyed through the impregnation parts 141 and 142, and the second fixing part 320 compressing and fixing the cathode flow path frame 120 at the lower side.

Here, the first fixing part 310 and the second fixing part 320 include through holes 311 and 321 respectively forming the anode common flow path 400a and the cathode common flow path 400b. The through holes 311 and 321 are formed at different locations on a plane from the through holes 115, 125, and 131 of the flow path frames 110 and 120 and the membrane 130. Here, the through hole 311 of the first fixing part 310 is an inflow hole and the through hole 321 of the second fixing part 320 is an outflow hole.

That is, in the fourth exemplary embodiment of the present invention, on the first fixing part 310 and the second fixing part 320, the through holes 311 and 321 forming the common flow paths 400a and 400b are formed on a plane at different locations from the through holes 115, 125, and 131 of the flow path frame and the membrane such that the common flow paths are provided in zigzag shapes in longitudinal directions. Thus, the common flow paths 400a and 400b are formed to make a distance between the inflow hole and the outflow hole to be out of the shortest distance.

For example, the first fixing part 310 is provided with the through holes 311 forming the anode common flow path 400a and the cathode common flow path 400b at the central portion of an edge, and the through hole 115 of the anode flow path frame 110 being laminated under the first fixing part 310 are formed to be located at opposite ends of an edge of the frame body 111. Also, the membrane 130 is laminated under the lower surface of the anode flow path frame 110, and is formed at a position corresponding to the through holes 115 and 125 of the anode flow path frame 110 and the cathode flow path frame 120. The through hole 321 of the second fixing part 320 is laminated under the lower surface of the cathode flow path frame 120, and is formed at a position corresponding to the through hole 311 of the first fixing part 310.

Thus, the common flow paths 400a and 400b are formed in a vertical direction from the first fixing part 310 to the anode flow path frame 110. Next, the common flow paths 400a and 400b are changed into a horizontal direction by the anode flow path frame 110, and are changed into a vertical direction by the laminated structure of the anode flow path frame 110, the membrane 130, and the cathode flow path frame 120. Also, the common flow paths 400a and 400b in a vertical direction are changed into a horizontal direction by the cathode flow path frames 120 and 220, and next, are chanced into a vertical direction at the through hole 321 of the second fixing part 320.

Here, the anode flow path frame 110 and the cathode flow path frame 120 form the common flow paths 400a and 400b in horizontal and vertical directions, and form provision flow paths for conveying the electrolyte to the impregnation parts 141 and 142. This will be described with reference to FIG. 17.

Figure 17:
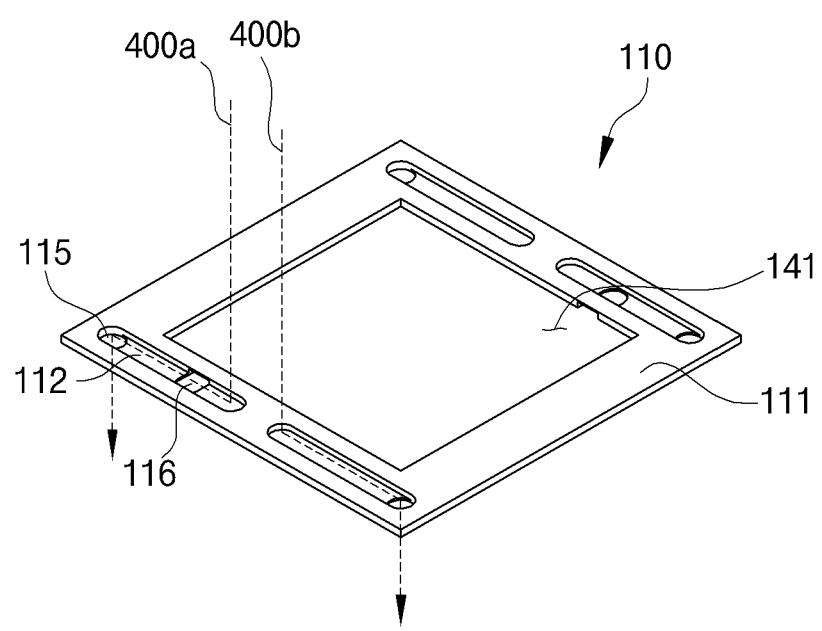
FIG. 17 is a perspective view illustrating a flow path frame of the fourth exemplary embodiment of the redox flow battery according to the present invention.

FIG. 17 is a perspective view illustrating a flow path frame of the fourth exemplary embodiment of the redox flow battery according to the present invention.

Referring to FIG. 17, the flow path frames 110 and 120 of the fourth exemplary embodiment of the present invention will be described with reference to the anode flow path frame 110 in FIG. 16. The flow path frame 110 includes: the frame body 111 in which the impregnation part 141 is formed; the through hole 115 forming the common flow paths 400a and 400b in a vertical direction in the frame body 111; the flow path groove 112 inwardly extending from the through hole 115; and a provision hole 116 penetratedly formed in the flow path groove 112 to convey the electrolyte to the impregnation part 141.

The through holes 115 are formed at the same locations as the through holes 131 of the membrane 130 such that the common flow paths 400a and 400b are formed with the flow path groove 112. For example, the anode flow path frame 110, the cathode flow path frame 120, and the membrane 130 are provided with the through holes 115 and 131 at the same locations such that a flow path in a vertical direction is formed.

The flow path grooves 112 are formed as inward grooves extending from the through holes 115 of the frame body 111 such that the common flow paths 400a and 400b conveying the electrolyte introduced through the through hole 311 of the first fixing part 310 being laminated to the upper side to the through holes 115 are formed in a horizontal direction.

The provision hole 116 is formed through the bottom surface of the flow path groove 112 such that provision flow paths conveying the electrolyte through the common flow paths 400a and 400b in a horizontal direction to the impregnation part 141 is formed.

That is, in the fourth exemplary embodiment of the present invention, the common flow paths 400a and 400b are formed in zigzag shapes. Thus, even though the flow rate of the electrolyte increases, the electrolyte is conveyed to the impregnation parts 141, 142, and 143 through the provision flow paths in the process of changing the direction of the flow path (from a vertical direction to a horizontal direction), whereby an equal amount of the electrolyte can be introduced into each cell.

The invention claimed is:

1. A redox flow battery having at least one cell, the at least one cell comprising:

a membrane provided with opposite surfaces that react an electrolyte being conveyed thereto, the opposite surfaces comprising a first surface and a second surface;

a first flow path frame laminated on the first surface of the membrane to convey an anolyte of the electrolyte, the first flow path frame having a first surface facing the membrane and a second surface opposite to the first surface, the first flow path frame having a first flow path including a first inflow path and a first outflow path to convey the anolyte to an impregnation part, the first flow path frame comprising:

a first path groove formed elongatedly on the second surface of first flow path frame to form the first inflow path which is apart from and not open to the impregnation part;

a first flow path hole formed at an end of the first inflow path to convey the anolyte received from the first inflow path to the first outflow path; and a first outflow groove formed on the first surface of the first flow path frame to form the first outflow path open to the impregnation part to convey the anolyte received from the first inflow path through the first flow path hole to the impregnation part;

a second flow path frame laminated on the second surface of the membrane to convey a catholyte of the electrolyte, the second flow path frame having a first surface facing the membrane and a second surface opposite to the first surface, the second flow path frame having a second flow path including a second inflow path and a second outflow path to convey the catholyte to the impregnation part, the second flow path frame comprising:

a second path groove formed elongatedly on the second surface of second flow path frame to form the second inflow path which is apart from and not open to the impregnation part;

a second flow path hole formed at an end of the second inflow path to convey the catholyte received from the second inflow path to the second outflow path; and a second outflow groove formed on the first surface of the second flow path frame to form the second outflow path open to the impregnation part to convey the catholyte received from the second inflow path through the second flow path hole to the impregnation part;

the impregnation part conveying to the membrane the electrolyte being supplied through the first and second flow path frames; and at least one fixing part formed on at least one of the first and second flow path frames, wherein each of the first and second path frames, the membrane and the at least one fixing part is provided with:

a first through hole forming a first common flow path that is different from the first flow path, the first common flow path conveying the anolyte of the electrolyte; and a second through hole forming a second common flow path that is different from the second flow path, the second common flow path conveying the catholyte of the electrolyte.

2. The redox flow battery of claim 1, wherein the first and second flow path frames are fixed to a surface of the at least one fixing part in which an unconsolidated portion maintaining an empty space therebetween and a consolidated portion tightly adhering thereto without an empty space are formed; and the unconsolidated portion forms a closed curved surface.

3. The redox flow battery of claim 1, wherein at least one of the first inflow path and the second inflow path is formed as being divided.

4. The redox flow battery of claim 1, wherein at least one of the first and second flow path frames have one or more division walls protruding from a bottom surface in the flow path grooves, the division walls being spaced apart from each other.

5. A redox flow battery comprising a plurality of cells, each cell comprising:

a membrane provided with opposite surfaces that react an electrolyte being conveyed thereto, the opposite surfaces comprising a first surface and a second surface;

at least one flow path frame laminated on the opposite surfaces of the membrane to respectively convey an anolyte and a catholyte of the electrolyte;

an impregnation part conveying to the membrane the electrolyte being supplied through the at least one flow path frame; and at least one fixing part fixing the membrane or the at least one flow path frame, wherein the membrane or the at least one fixing part is provided with a through hole forming a common flow path conveying the electrolyte;

the at least one flow path frame comprises:

a first flow path frame having a first surface facing the membrane and a second surface opposite to the first surface, the first flow path frame having a first flow path that is different from the common flow path, and the first flow path including a first inflow path and a first outflow path to convey one of the anolyte and the catholyte to the impregnation part, the first flow path frame comprising:

a first path groove formed elongatedly on the second surface of first flow path frame to form the first inflow path which is apart from and not open to the impregnation part;

a first flow path hole formed at an end of the first inflow path to convey the one of the anolyte and the catholyte received from the first inflow path to the first outflow path; and a first outflow groove formed on the first surface of the first flow path frame to form the first outflow path open to the impregnation part to convey the anolyte received from the first inflow path through the first flow path hole to the impregnation part;

a second flow path frame laminated on the second surface of the membrane to convey the other of the anolyte and the catholyte, the second flow path frame having a first surface facing the membrane and a second surface opposite to the first surface, the second flow path frame having a second flow path that is different from the common flow path, the second flow path including a second inflow path and a second outflow path to convey the other of the anolyte and the catholyte to the impregnation part, the second flow path frame comprising:

a second path groove formed elongatedly on the second surface of second flow path frame to form the second inflow path which is apart from and not open to the impregnation part;

a second flow path hole formed at an end of the second inflow path to convey the catholyte received from the second inflow path to the second outflow path; and a second outflow groove formed on the first surface of the second flow path frame to form the second outflow path open to the impregnation part to convey the other of the anolyte and the catholyte received from the second inflow path through the second flow path hole to the impregnation part.

6. The redox flow battery of claim 5, wherein the at least one fixing part includes a first fixing part and a second fixing part located at outermost portions to fix the membrane and the at least one flow path frame that are laminated therebetween; and the first fixing part and the second fixing part are provided with a through hole formed at a different location on a plane from the through hole formed on the membrane or the at least one flow path frame.

7. The redox flow battery of claim 5, wherein each of the first and second inflow paths is coupled, respectively, to each of the first and second outflow paths via a provision hole being thoroughly formed.

8. The redox flow battery of claim 7, wherein at least one of the first and second outflow paths is formed at at least one surface of the opposite surfaces of the at least one flow path frame as at least one of the first and second outflow grooves being connected to the provision hole.

9. The redox flow battery of claim 5, further comprising:
a leakage preventing part preventing leakage of the electrolyte at the opposite surfaces of the at least one flow path frame.

10. The redox flow battery of claim 9, wherein the leakage preventing part is one selected from an adhesive attaching the at least one flow path frame, a gasket laminated to the opposite surfaces of the flow path frame, and an O-ring.

11. The redox flow battery of claim 9, wherein the leakage preventing part is provided with a cutout hole being connected to at least one the first and second inflow paths and the first and second outflow paths.

12. The redox flow battery of claim 9, wherein the leakage preventing part is provided with a through hole forming the common flow path.

13. The redox flow battery of claim 1, further comprising:
a leakage preventing part preventing leakage of the electrolyte at the opposite surfaces of the at least one flow path frame.

14. The redox flow battery of claim 5, wherein the common flow path is formed in a zigzag shape.

* * * * *